Aug. 21, 1928.
A. H. G. FOKKER
AIRPLANE
Filed May 25, 1923   3 Sheets-Sheet 3
1,681,331
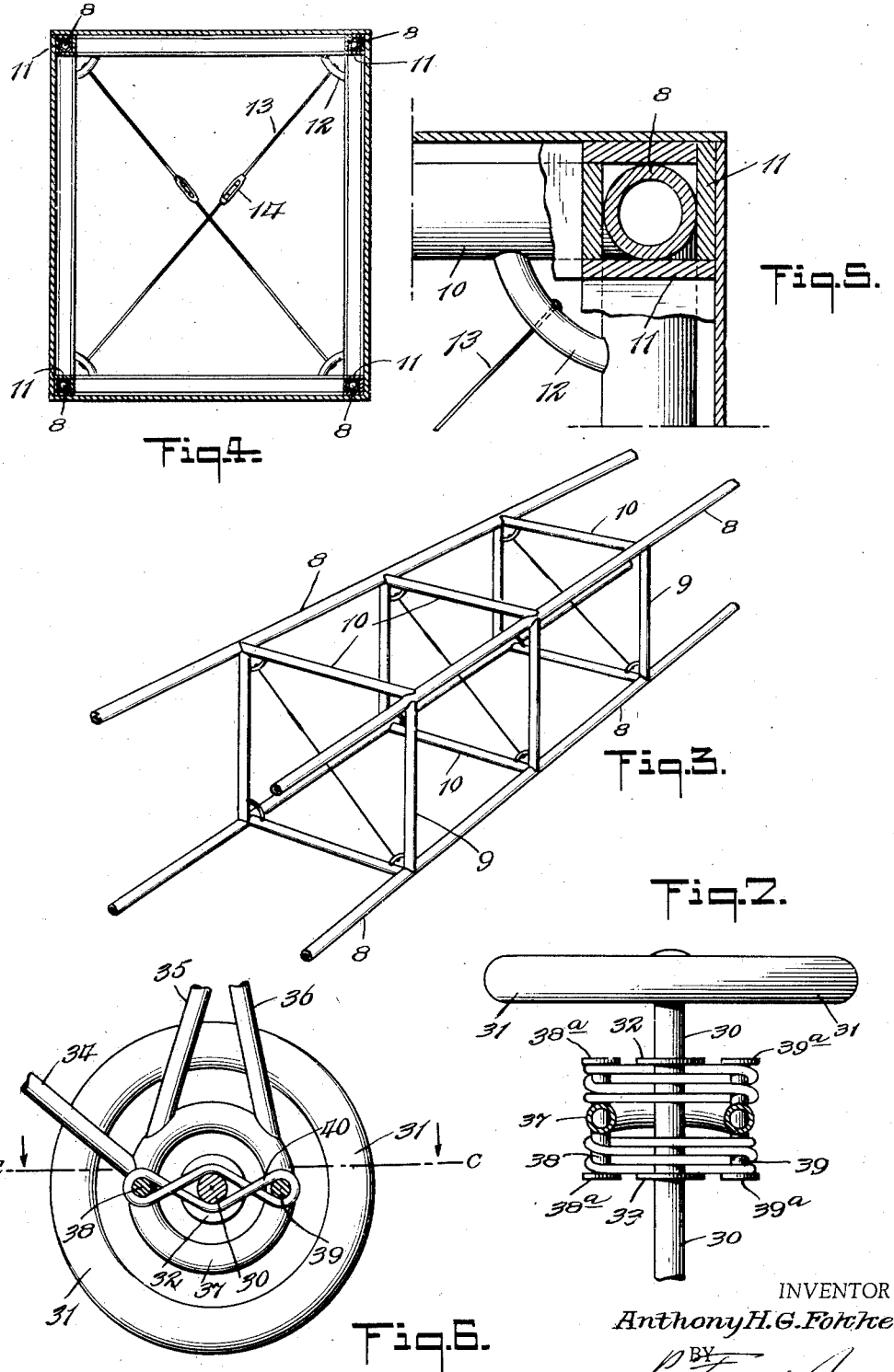
INVENTOR
Anthony H. G. Fokker
ATTORNEY Patented Aug. 21, 1928.

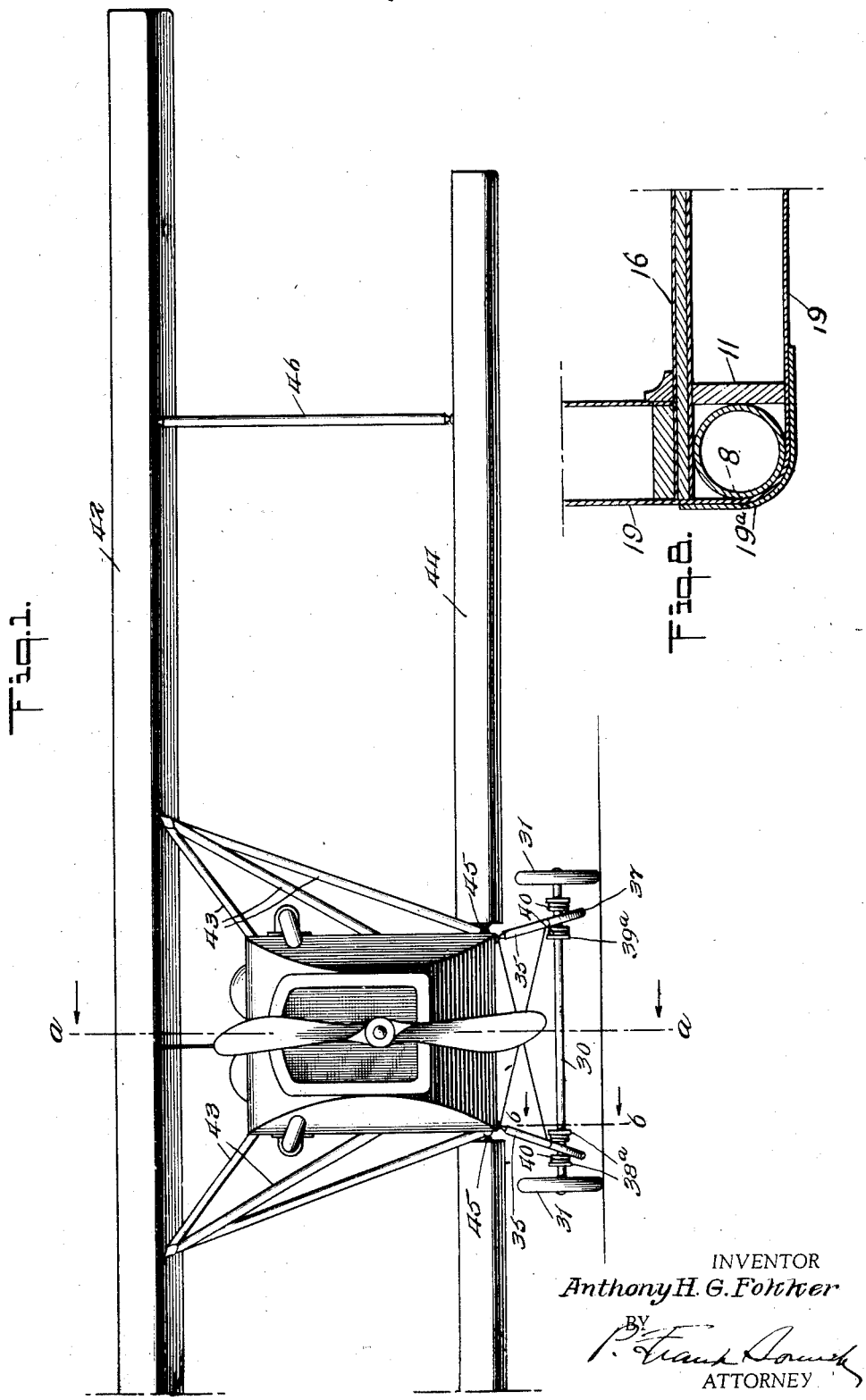

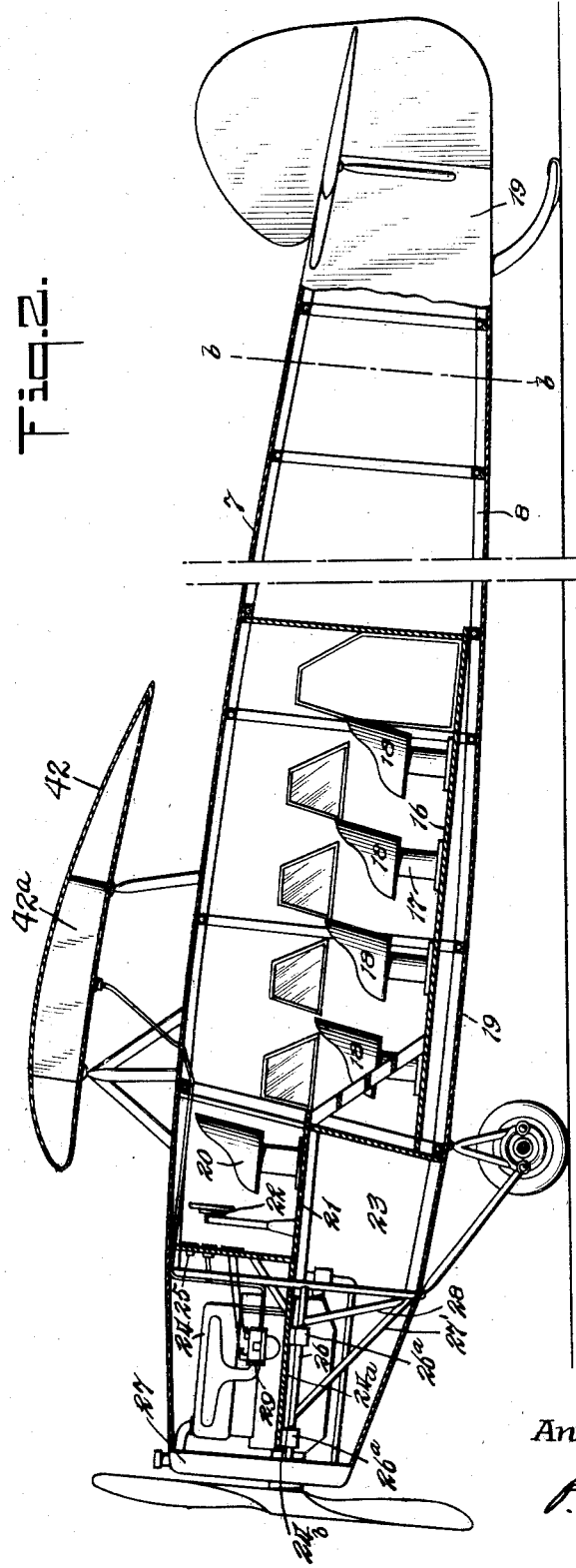

1,681,331

UNITED STATES PATENT OFFICE.

ANTHONY H. G. FOKKER, OF AMSTERDAM, NETHERLANDS, ASSIGNOR TO ATLANTIC AIRCRAFT CORPORATION, A CORPORATION OF NEW JERSEY.

AIRPLANE.

Application filed May 25, 1923. Serial No. 641,324.

The present invention relates to improvements in airplanes.

As is well known, the highest speeds in flight have been obtained by the employment of the monoplane construction, while the airplanes of the greatest load-carrying capacity are generally of the biplane type. Also, the landing speed of the monoplane is much higher than that of the biplane, and, therefore, where it is desired to employ the airplane for commercial transportation, it is frequently necessary to maintain a double equipment, a fleet of monoplanes being used for those forms of service which require fast travel, while biplanes are employed for slower services where greater load-carrying capacities are necessary. Obviously, this double equipment entails great expense, not only in the initial cost but in maintenance cost, for which reason commercial aviation has been considerably retarded.

It is also well known that airplane motors have definitely established periods of efficient performance, after which replacements must be made and the motor overhauled and tuned up. These operations make it necessary to remove the airplane, whose power plant is to be overhauled, from service for considerable periods, and greatly adds to the relatively excessive cost of maintenance of the airplane and its equipment. In fact, each idle airplane means a distinct economic loss, and, when it is considered that every plane must be taken out of service at fairly well established intervals, it will be seen that the resultant loss is great.

The general object of the present invention is to reduce the cost of equipment and its maintenance in airplane transportation services, so that the airplane may compete with other forms of transportation on a more equal basis than is possible under present conditions.

A further object of my invention is to eliminate the losses flowing from the removal of airplanes from service during the overhauling of their power plants, and to generally increase the efficiency and durability of the airplane structures.

More specifically, my invention is directed to the provision of an airplane of the monoplane type which may be quickly converted into a biplane, the said airplane being capable of performing with highest efficiency either as a monoplane or as a biplane.

My invention further contemplates a power plant and control unit which may be detached or removed from the fuselage of the airplane with very little effort, so that, when it is necessary to overhaul a motor or engine. it may be quickly taken from its bed and a new engine substituted therefor, so that the plane may be kept in substantially continuous service.

In carrying out the principle of my invention, I have also provided an improved fuselage construction which embodies rigidity, lightness and durability, and enables me to readily attain the results to which my invention is directed.

Other objects and advantages of my improved airplane construction will present themselves as I proceed with the description, and I would have it understood that I reserve unto myself all rights to the full range of equivalents, both in structure and uses, to which I may be entitled under my invention in its broadest aspect.

For the purposes of the present disclosure, I have elected to illustrate and describe certain preferred embodiments of my invention, although manifestly the objects of my invention may be attained in other ways without departing from the spirit and scope thereof.

In the drawings, Figure 1 is a front elevation of an airplane made in accordance with my invention;

Fig. 2 is a longitudinal section on the line $a$—$a$ of Fig. 1;

Fig. 3 is a perspective of the tubular framework or skeleton of the fuselage;

Fig. 4 is a transverse section taken on the line $b$—$b$ of Fig. 2, showing the frame construction of the fuselage;

Fig. 5 is an enlarged detail view of the structure shown in Fig. 4;

Fig. 6 is an elevation of a fragment of the undercarriage or landing gear made in accordance with my invention;

Fig. 7 is a view taken on the line $c$—$c$ of Fig. 6; and

Fig. 8 is a transverse section of a modified form of the fuselage construction shown in Figs. 4 and 5.

Referring now to the drawings in detail, in which like characters of reference are employed to designate similar parts throughout the several views, 7 indicates the fuselage which is of a so-called box girder type, the frame being formed of tubing enclosed or housed within boxing of wood or other suitable material. In the construction of the fuselage, the longérons 8 are connected and braced by the upright and transverse struts 9 and 10 located at substantially equidistant points or at such points as may be found desirable for obtaining the greatest strength and efficiency. The upright and transverse members 9 and 10 are welded to the longérons 8, and the tubing is then encased in boxing formed of wood slats or other fibrous material, as indicated at 11 in Fig. 5, which not only serves to conceal the tubing but stiffens and reinforces the same against buckling, so that I am enabled to use tubing of a lesser diameter than could otherwise be employed. Further, it will be obvious that the tubing in turn will relieve the tension members from tension strains to a considerable degree, the resultant structure being a framework which is light, resistant and durable.

To further reinforce the tail portion of the fuselage, I have found it desirable to employ corner braces 12, preferably tubular and of an arcuate shape, which may be welded or otherwise fastened to the connected upright and transverse members of the frame, as clearly shown in Fig. 5. The diagonally opposite corners of the rectangle formed by the upright and transverse members 9 and 10 may be connected by suitable diagonally disposed tie-rods 13 provided with turn-buckles 13$^a$ or other means for adjusting the tension. The ends of these tie-rods may be connected directly to the tubular braces 12 in any suitable manner, for instance, as shown in Fig. 5.

It will be noted that in the present disclosure I have shown my invention applied to an airplane of the passenger carrying type, the upright struts 9 of the midship section being connected by the diagonal struts 15, and the cabin being provided with suitable flooring 16 to which the pedestals 17 of the seats 18 are fixed. The frame structure of the fuselage is braced by a skin or covering of three-ply veneer, as shown at 19, the laminations of which are glued together and the veneer sections nailed or otherwise securely fastened to the boxing of the framework. This covering, in addition to rigidly bracing the framework of the fuselage, also has an advantage in that it is unnecessary to specially construct the cabin or midship section of the fuselage, as is the case where the usual canvas fuselage covering is employed. Suitable windows and a door for ingress or egress of passengers are located in the covering material, as shown, or in any manner which may be deemed desirable to meet requirements of production and use. It will be obvious, of course, that in lieu of the veneering I may employ metal as a fuselage covering or any other material which may be found suitable to carrying out the purposes of my invention.

Forward of the cabin, the usual cockpit or driving compartment is provided, the aviator's seat 20 being positioned on a platform 21 adjacent to the control wheel 22, the lower half 23 of the compartment forming the cockpit serving as a storage space.

The power plant, instruments and controls for the power plant in my present invention are assembled to form a single unit, the crank case of the engine 24 being provided with longitudinal fins or extensions 24$^a$ which are of a sufficient length to extend into the cockpit, and which support the instrument and power plant control board 25 in a position which render the instruments in control readily observable by and accessible to the aviator.

The power plant and control unit are supported on the usual bed or frame in advance of the cockpit, which, in the present invention, consists of the tubular members 26, 27' and 28, preferably cooperatively arranged, as shown, and welded together at their points of joinder so as to provide a strong and rigid support. The parallel members 26 of the engine frame or bed are provided with laterally extending lugs 26$^a$, upon which the complemental lugs 24$^b$ of the engine or motor 24 are adapted to bear or rest. The engine lugs 24$^b$ are bolted to the frame lugs 26$^a$, and the complete power plant and control unit is thus rigidly held in functioning position by these four bolts. It will be manifest that, at any time when it is desired to overhaul the motor 24, the radiator 27, which is supported from the frame member 26, water connections, motor, exhaust stacks and the various indicators and power plant controls carried by the instrument board 25, may be readily removed by the simple expedient of disconnecting the engine lugs 24$^b$ from the engine bed lugs 26$^a$ and uncoupling the connection from the gasoline tank 42$^a$ located within the wing 42 to the carbureter 29. Therefore, it will be necessary to have the airplane out of service only for the minimum of time which is required for removing the disabled power plant unit and substituting another therefor.

In the present improved airplane construction, I have devised an under-carriage of a design which permits the use of a full floating axle suspended entirely between shock absorber mediums which receive and dissipate both the landing and rebound shocks, and also the side loads resulting from landing when drifting sidewise. In this improved design of under-carriage, the axle 30, having the usual wheels 31 mounted thereon, is provided with spaced apart annular flanges or collars 32 and 33 adjacent to its ends. Supported from the under part or body of the fuselage, by means of the tubular struts 34, 35 and 36, the latter two of which converge to a single point of connection with the fuselage, is an annular, preferably metallic, ring 37. This ring, which may be welded to the struts 34, 35 and 36, carries the stubs 38 and 39 in planes parallel to the axle 30, the said stubs having flanged ends 38ª and 39ª respectively. The axle 30, it will be observed, is concentric with the ring 37, and is connected with the oppositely disposed stubs 38 and 39 by the bands 40, which may be rubber-cord or any other resilient material having the requisite strength. From this description of the under-carriage, it will be observed that the axle is freely suspended within the ring 37, and is thus capable of a relatively wide range of movement in absorbing the landing and rebound shocks to which the under-carriage is subjected. By the convergence of the struts 35 and 36 to a single point of joinder with the under part of the fuselage, the main weight of the airplane is equally distributed to the cooperating parts of the under-carriage, while the strut 34 imparts the necessary fore and aft rigidity thereto. The convergent struts 35 and 36 and the strut 34 may be connected to the under part of the fuselage by any suitable means, such, for instance, as the well known ball and socket connection employed in airplane construction.

In constructing an airplane in accordance with my present invention, I employ a wing or plane 42 which is of the internally trussed or of the deep cantilever type commonly used in monoplane construction, this wing or plane being supported from and connected to the fuselage by the usual struts 43. The airplane is of a design whereby it may perform with the highest efficiency as a monoplane, and, under those conditions of use where fast flight is essential and high landing speeds may be made, the single wing or plane 42 is ample to meet all requirements. On the other hand, for conditions of service where load-carrying capacity and low landing speeds are important requisites, I am enabled to convert my airplane from a monoplane into a biplane by the addition of the lower or under wing or plane 44. This under wing or plane may be of any desired construction and of an area suitable to the work which the airplane must perform when operating as a biplane, the said under-wing or plane 44 being connected to the fuselage by ball and socket joints as at 45. The under side of the cantilever wing or plane 42 is provided with a suitable socket or other connection for struts 46, whereby the lower or under wing 44 and the upper wing 42 may be connected in the manner generally followed in biplane construction.

It will be evident that, by the employment of my invention, an airplane may be converted from a monoplane into a biplane, or vice versa, in a very short period of time, by installing or removing the lower wing 44, as the case may be. Obviously, this will materially reduce the cost of airplane equipment for transportation purposes, inasmuch as the wings 44 may be of different sizes and areas, so that any desired load capacity and minimum landing speed may be attained within the limits of the engine power and the structural strength of the upper wing or plane 42 and the interconnected parts.

In the modified form of fuselage construction shown in Fig. 8, I dispense with certain of the strips or slats 11 and enclose the longéron 8 within a space provided by the flooring 16, a slat 11 and the outer wall or skin 19, the latter conforming to the contour of the portion of the longéron with which it is in contact, so that by the provision of the reinforcing strip 19ª an absolutely rigid construction is obtained.

The invention having been fully described, what is claimed is:

1. A double duty airplane for flying at high speed with a relatively small lift or for flying at a lower speed with a greater lift, comprising a fuselage, a wing located above the fuselage, supporting struts for said wing, inclined downwardly and inwardly from a point on said wing adjacent the vertical plane of each side of the fuselage and connected to the fuselage at their lower ends, said wing functioning as a supporting surface for the airplane for high speed flight, a pair of removable auxiliary supporting surfaces attachable to the sides of the fuselage below said wing for converting the airplane into a biplane, quick-detachable means for securing the auxiliary surfaces to the fuselage and detachable struts connecting each of said auxiliary surfaces and said wing at a point remote from the fuselage, said auxiliary surfaces being solely supported by their jointure with the fuselage and said detachable struts.

2. A monoplane having a thick wing located at the top of the fuselage and means for converting said monoplane into a biplane, said means comprising a pair of auxiliary lifting surfaces, ball and socket connections for attaching said auxiliary surfaces to said fuselage, one on each side thereof and below said thick wing, and detachable struts connecting each of said auxiliary surfaces and said thick wing at a point remote from the fuselage, said ball and socket connections and said detachable struts constituting the sole supporting means of said auxiliary surfaces.

3. A monoplane embodying a fuselage and a cantilever wing located at the top of the fuselage and means for converting said monoplane into a biplane, said means comprising auxiliary supporting surfaces, means capable of universal movement for connecting each of said surfaces to the fuselage at the innermost rib station and detachable struts connecting each of said auxiliary surfaces to said cantilever wing at a point remote from the fuselage, the auxiliary surfaces being wholly supported by said universal connections and said detachable struts.

ANTHONY H. G. FOKKER.